United States Patent
Jang et al.

(10) Patent No.: US 10,210,363 B1
(45) Date of Patent: Feb. 19, 2019

(54) OPTICAL COMMUNICATION SYSTEM AND METHOD, TRANSMITTING DEVICE AND RECEIVING DEVICE FOR THE SAME

(71) Applicant: Industrial Technology Research Institute, Hsinchu (TW)

(72) Inventors: Lih-Goung Jang, Hsinchu (TW); Tai-Shen Ho, Hsinchu (TW); Chi-Neng Liu, Hsinchu (TW); Xin-Lan Liao, Hsinchu (TW); Po-Yu Huang, Hsinchu (TW); Yi-Yuan Chen, Hsinchu (TW); Kun-Hsien Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/796,821

(22) Filed: Oct. 29, 2017

(30) Foreign Application Priority Data

Aug. 4, 2017 (TW) .............................. 106126391 A

(51) Int. Cl.
*G06K 7/10* (2006.01)
*G06K 7/14* (2006.01)

(52) U.S. Cl.
CPC ....... *G06K 7/10722* (2013.01); *G06K 7/1413* (2013.01)

(58) Field of Classification Search
CPC .. G06K 7/10732; G06K 7/10722; G06K 7/10; G06K 7/10594
USPC .................. 235/462.01, 472.01, 454; 396/57
See application file for complete search history.

(56) References Cited

U.S. PATENT DOCUMENTS

| 5,634,144 A * | 5/1997 | Mauro ................... G03B 7/091 |
| | | 348/E5.043 |
| 8,749,168 B2 | 6/2014 | Kamada et al. |
| 9,262,954 B2 | 2/2016 | Oshima et al. |
| 9,287,977 B2 | 3/2016 | Oshima et al. |
| 9,468,053 B1 | 10/2016 | Kido et al. |
| 2015/0020822 A1 | 1/2015 | Janardhan et al. |

(Continued)

FOREIGN PATENT DOCUMENTS

| TW | M524592 U | 6/2016 |
| TW | I544757 B | 8/2016 |
| WO | 2016/118058 A1 | 7/2016 |

OTHER PUBLICATIONS

H. Aoyama et al., "Visible Light Communication Using a Conventional Image Sensor," 12th IEEE CCNC Conference, Jan. 9-12, 2015, pp. 103-108.

(Continued)

*Primary Examiner* — Jamara Franklin
(74) *Attorney, Agent, or Firm* — Mintz Levin Cohn Ferris Glovsky and Popeo, P.C.; Peter F. Corless; Steven M. Jensen

(57) ABSTRACT

The present disclosure provides an optical communication system, an optical communication method, and a transmitting device and a receiving device for the same. The optical communication system includes: a transmitting device for generating a control signal according to at least one encoding information to drive a light emitting device to actuate; and a receiving device for capturing a plurality of images via an image capturing module during actuation of the light emitting device, and decoding the plurality of images to obtain the encoding information.

35 Claims, 8 Drawing Sheets

(56) References Cited

U.S. PATENT DOCUMENTS

2015/0280817 A1 10/2015 Roberts
2016/0182889 A1 6/2016 Olmstead

OTHER PUBLICATIONS

H. Aoyama et al., "Line Scan Sampling for Visible Light Communication: Theory and Practice," 2015 IEEE ICC Optical Networks and Systems Symposium, May 21-25, 2015, pp. 5060-5065.
K. Jo et al., "DisCo: Display-Camera Communication Using Rolling Shutter Sensors," ACM Transactions on Graphics, vol. 35, Issue No. 5, Article 150, Jul. 2010, pp. 150:1-150:13.
H. Lee et al., "RollingLight: Enabling Line-of-Sight Light-to-Camera Communications," MobiSys 215 Proceedings of the 13th Annual International Conference on Mobile Systems, Applications, and Services, May 18-22, 2015, pp. 167-180.

\* cited by examiner

FIG. 8

OPTICAL COMMUNICATION SYSTEM AND METHOD, TRANSMITTING DEVICE AND RECEIVING DEVICE FOR THE SAME

CROSS-REFERENCE TO RELATED APPLICATION

The present application is based on, and claims priority from, Taiwan (International) Application Serial Number 106126391, filed Aug. 4, 2017, the disclosure of which is hereby incorporated by reference herein in its entirety.

TECHNICAL FIELD

The present disclosure relates to an optical communication system, an optical communication method, and a transmitting device and a receiving device for the same.

BACKGROUND

Advances in technology have allowed smartphones to become an indispensable product in our everyday lives, and several technologies that enable interactions with the smartphones have been developed, such as QR code, Near-field communication (NFC), and Beacons. Information about navigation, products and the like that may be obtained with a smartphone in hand through QR code, NFC or Beacons technology.

However, the above interactive technologies still have their limitations. For example, an image of the QR code must be clearly captured at a specific distance to be recognized; otherwise, information cannot be retrieved successfully. Similarly, NFC signals may only be read within a short range, and cannot be read effectively if shielded by crowds. Furthermore, for Beacons Bluetooth technology, when multiple Bluetooth devices are in communication at the same time, the sources of information may get mixed up, and the Bluetooth wireless signals cannot penetrate crowds of people and may get reflected, resulting in signal drifts.

SUMMARY

According to an embodiment of the present disclosure, an optical communication system is provided, which may include: a light emitting device for illuminating and transmitting communication information; a transmitting device that may include: an encoding module for outputting at least one encoding information based on the communication information, wherein the encoding information includes a plurality of frequency codes that are arranged in an encoding sequence; an optical signal generating module for generating a control signal based on the encoding information; and an optical driver module for driving the light emitting device to actuate based on the control signal and transmit the communication information; and a receiving device that may include: an image capturing module for capturing an image stream in a time interval during the actuation of the light emitting device, wherein the image stream includes a plurality of images; and an image decoding module for processing the plurality of images to obtain the plurality of frequency codes.

According to an embodiment of the present disclosure, an optical communication transmitting device is also provided, which may include: a light emitting device for illuminating and transmitting communication information; an encoding module for outputting at least one encoding information based on the communication information, wherein the encoding information includes a plurality of frequency codes that are arranged in an encoding sequence; an optical signal generating module for generating a control signal based on the encoding information; and an optical driver module for driving the light emitting device to actuate based on the control signal and transmit the communication information.

According to an embodiment of the present disclosure, an optical communication receiving device is further provided, which may include: an image capturing module for capturing an image stream in a time interval during actuation of a light emitting device, wherein the image stream includes a plurality of images; and an image decoding module for processing the plurality of images to obtain encoding information containing a plurality of frequency codes.

According to an embodiment of the present disclosure, an optical communication method is still provided, which may include the following steps of: outputting at least one encoding information and generating a control signal based on communication information, wherein the encoding information includes a plurality of frequency codes that are arranged in an encoding sequence; driving a light emitting device to actuate based on the control signal and transmit the communication information; capturing an image stream in a time interval during the actuation of the light emitting device, wherein the image stream includes a plurality of images; and processing the plurality of images to obtain the plurality of frequency codes.

BRIEF DESCRIPTION OF THE DRAWINGS

FIG. 8 is a schematic diagram depicting classification sequentially performed on a sequence of a plurality of width values by a classification module in the optical communication receiving device in accordance with an embodiment of the present disclosure.

DETAILED DESCRIPTION OF DISCLOSED EMBODIMENTS

Figure 1:
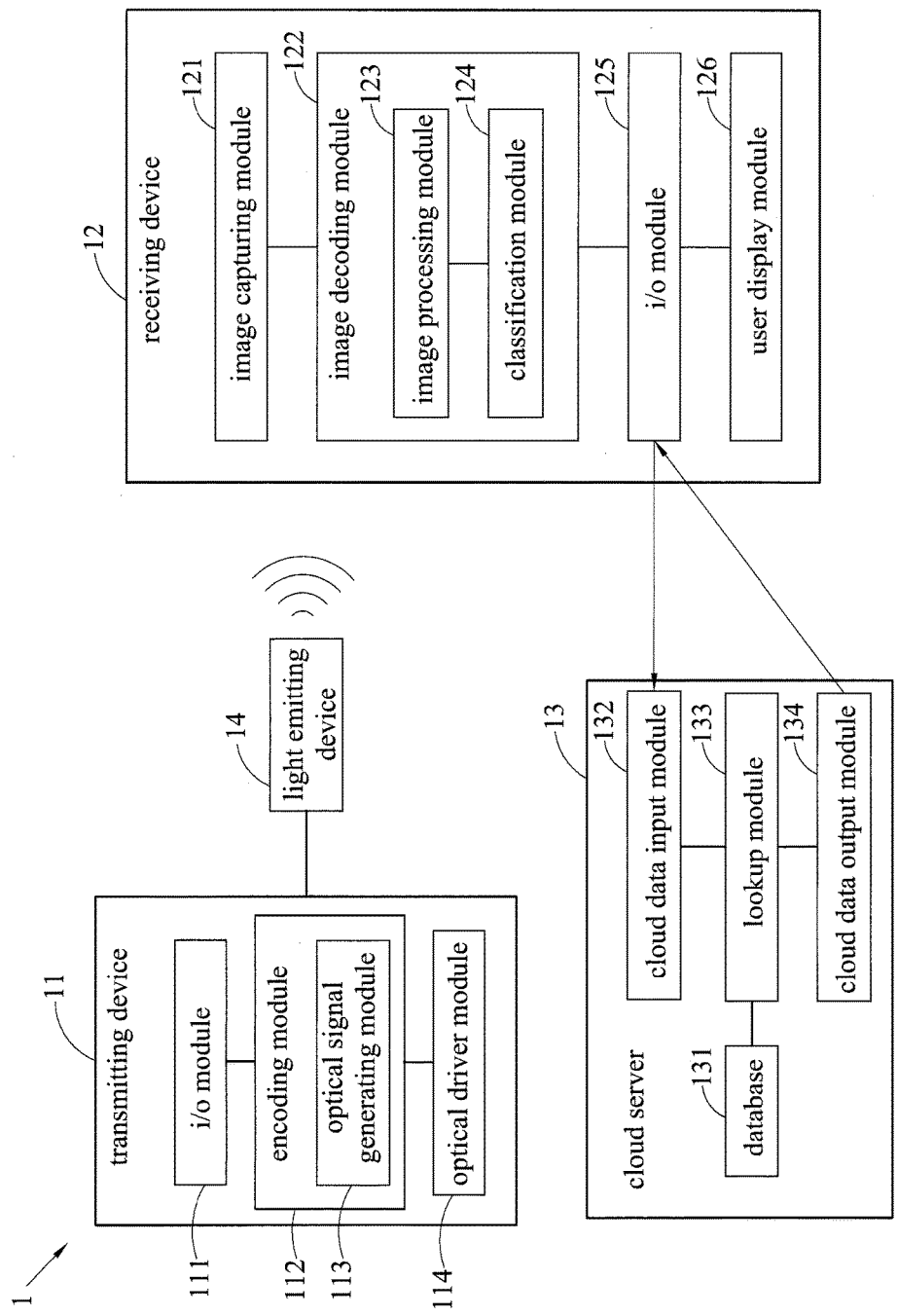
FIG. 1 is a schematic diagram depicting the framework of an optical communication system in accordance with an embodiment of the present disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 is a schematic diagram depicting an optical communication system 1 in accordance with an embodiment of the present disclosure. The optical communication system 1 includes a transmitting device 11 and a receiving device 12. The transmitting device 11 includes an input/output (I/O) module 111, an encoding module 112, an optical signal generating module 113 and an optical driver module 114. The receiving device 12 includes an image capturing module 121, an image decoding module 122, an image processing module 123, a classification module 124, an I/O module 125 and a user display module 126.

In an embodiment, the I/O module 111 may be an I/O circuit for updating the firmware for the encoding module 112, by, for example, directly burning the program onto the encoding module 112, without requiring the use of additional circuit such as JTAGE circuit, and the I/O module 111 may also be used for receiving communication information and inputting the communication information into the encoding module 112. The I/O module 111 may be implemented by other types of communication transceiver elements or circuits, including, but the scope of the present disclosure is not limited to, a USB, BT, Wi-Fi, Ethernet, RS232 interface.

In an embodiment, the encoding module 112 and the optical signal generating module 113 may correspond to a firmware executing circuit such as an executing program in the firmware by a processor. The optical driver module 114 may correspond to a light emitting device (LED) driver circuit for driving a light emitting device 14 upon receiving a signal from the optical signal generating module 113. In an embodiment, the LED driver circuit includes an anti-surge and/or overvoltage protection mechanism suitable in a DC wide voltage range.

In an embodiment, the light emitting device 14 is used for illuminating and transmitting the communication information, and may be, but the scope of the present disclosure is not limited to, an LED lamp for general lighting, an LED light box for advertisement, an LED lamp for exhibition, and an LED device for display.

In an embodiment, the encoding module 112 is configured for outputting at least one encoding information based on the communication information, wherein the encoding information includes a plurality of frequency codes that are arranged according to an encoding sequence. In an embodiment, the encoding module 112 outputs the encoding information based on pre-stored default communication information or communication information input by the I/O module 111. In an embodiment, the plurality of frequency codes included in the encoding information corresponds to a plurality of frequency values. In an embodiment, the frequency codes may include at least one number such as 1, 2 or 3 or other texts. The encoding information may include one-digit frequency codes or multiple-digits frequency codes. Each digit of the frequency codes corresponds to a different frequency value. The scope of the present disclosure does not limit the number of frequency codes.

For example, the encoding module 112 may store a lookup table as shown in Table 1 below. The lookup table may be stored in a memory coupled to the encoding module 112 or disposed directly in the encoding module 112. The scope of the present disclosure does not limit to the frequency value to which a frequency code corresponds. Each frequency code corresponds to a different frequency value. Table 1 is merely an example.

TABLE 1

|  | $1^{st}$-digit Frequency Code | $2^{nd}$-digit Frequency Code | $3^{rd}$-digit Frequency Code | $4^{th}$-digit Frequency Code |
| --- | --- | --- | --- | --- |
| Content | 0 | 1 | 2 | 3 |
| Frequency Value | 800 Hz | 290 Hz | 380 Hz | 275 Hz |

Figure 3:
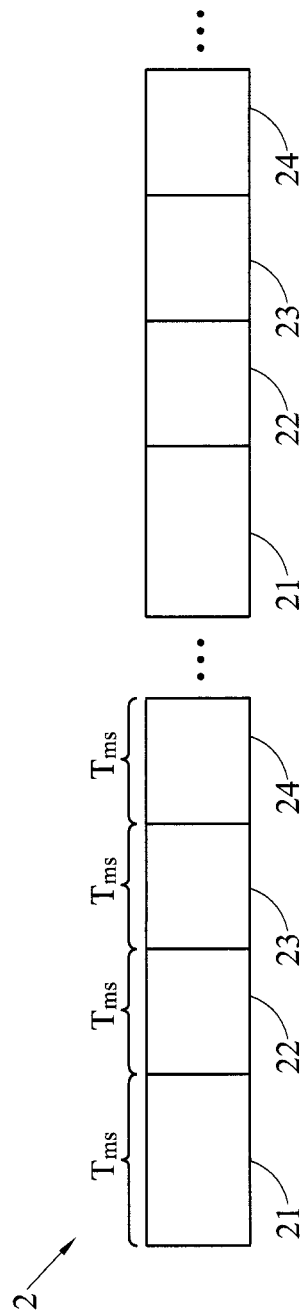
FIG. 3 is a schematic diagram depicting a 1D matrix of frequency codes outputted by an optical communication transmitting device in accordance with an embodiment of the present disclosure.

As shown in FIG. 3, the encoding module 112 may output at least one encoding information based on communication information, for example, output 1-dimensional matrix 2 of frequency codes arranged based on an encoding sequence. The 1-dimensional matrix 2 of frequency codes may include a plurality of transmission data including a $1^{st}$-cligit frequency code 21, a $2^{nd}$-digit frequency code 22, a $3^{rd}$-digit frequency code 23 and a $4^{th}$-digit frequency code 24. Taking the above encoding information 0123 as an example, the 1-dimensional matrix 2 of frequency codes is then 0123-0123 . . . , wherein each digit of the frequency codes corresponds to a specific frequency value based on the lookup table above. Thus, the encoding module 112 may output a plurality of frequency value corresponding to the 1-dimensional matrix 2 of the frequency codes sequentially.

The optical signal generating module 113 is used for generating a control signal based on the encoding information. The control signal generated by the optical signal generating module 113 includes pulse signals of a plurality of frequency values. The plurality of frequency values in the pulse signals correlate to the plurality of frequency codes included in the encoding information. In an embodiment, the control signal is a frequency-shift keying (FSK) signal.

The optical driver module 114 is used for driving the light emitting device 14 to actuate based on the control signal in order to transmit the communication information, wherein duty ratios of the pulse signals in the control signal correlate to the illumination of light produced by the light emitting device 14. In another embodiment, upon receiving the encoding information outputted by the encoding module 112, the optical signal generating module 113 produces the control signal by modulation using an algorithm for calculating the average value of illuminations. The algorithm for calculating the average value of illuminations is further described below.

Using the above example where the encoding information includes 4 digits of frequency codes and each frequency code corresponds to a frequency value, the $1^{st}$-digit frequency code 21 of the encoding information corresponds to a frequency value of 800 Hz and a illumination of 500 lux; the $2^{nd}$-digit frequency code 22 of the encoding information corresponds to a frequency value of 290 Hz and a illumination of 150 lux; the $3^{rd}$-digit frequency code 23 of the encoding information corresponds to a frequency value of 380 Hz and a illumination of 250 lux; the 4th-digit frequency code 24 of the encoding information corresponds to a frequency value of 275 Hz and a illumination of 100 lux.

First, the average value of the illuminations to which the frequency values correspond is calculated. In the case above, the average value of the illuminations is about 250 lux. The duty ratios (on and off ratio) of the pulse signals in the control signal corresponding to the frequency values are then adjusted based on this average value. In an embodiment, the duty ratio for the frequency value corresponding to the $1^{st}$-digit frequency code 21 is for example adjusted from symmetrical to non-symmetrical duty ratio, such as, from 50% on and 50% off to 30% on and 70% off. The duty ratio for the frequency value corresponding to the $2^{nd}$-digit frequency code 22 is adjusted to a duty ratio representing 60% on and 40% off. The duty ratio for the frequency value corresponding to the $3^{rd}$-digit frequency code 23 is not adjusted (with a duty ratio representing 50% on and 50% off). The duty ratio for the frequency value corresponding to the $4^{th}$-digit frequency code 24 is adjusted to a duty ratio representing 70% on and 30% off. As a result, when the optical driver module 114 drives the light emitting device 14 to actuate based on the control signal, the control signal generated after this adjustment allows the illumination of the light produced by the light emitting device 14 to be more uniform. In other words, lux values between different frequency values tend to coherence, so that the uniform illumination of the light emitting device 14 may be maintained.

In an embodiment, as shown in FIG. 3, in the 1-dimensional matrix 2 of frequency codes outputted based on pre-stored default communication information or communication information inputted using the I/O module 111, the units of time for the $1^{st}$, $2^{nd}$, $3^{rd}$ and $4^{th}$-digit frequency code 21, 22, 23 and 24 are all the same (for example, $T_{ms}$), therefore in the control signal generated by the optical signal generating module 113, the units of time corresponding to the various frequency values are also the same.

Figure 5:
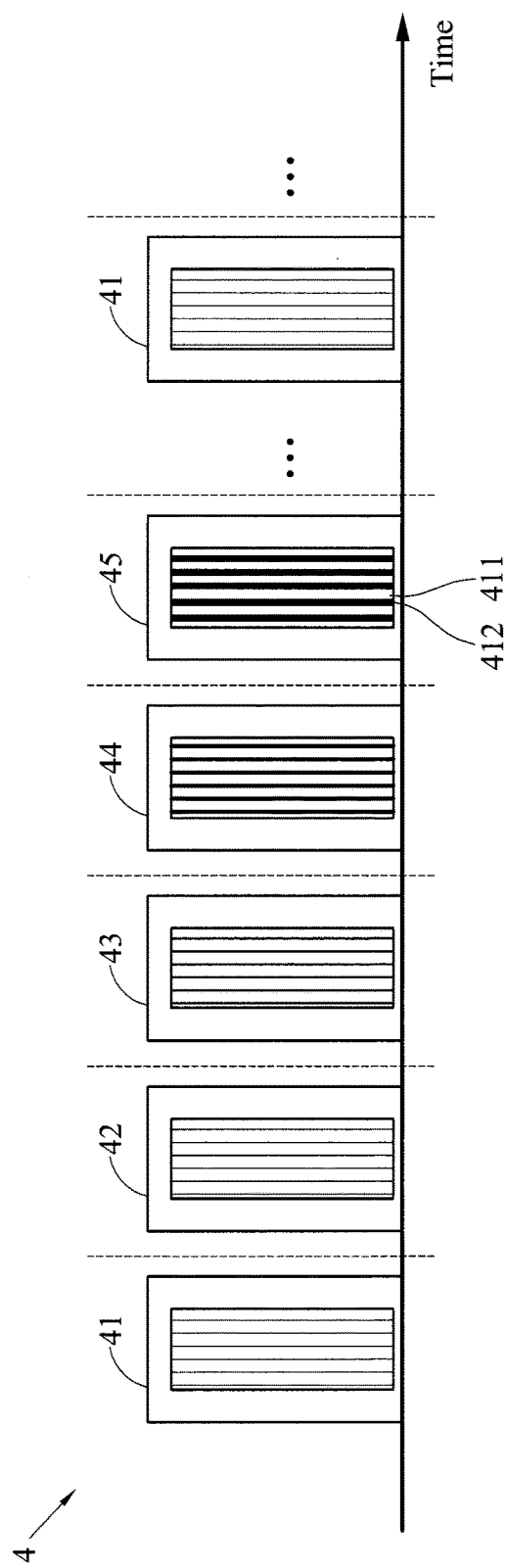
FIG. 5 is a schematic diagram depicting an image stream captured by the image capturing module in the optical communication receiving device in accordance with an embodiment of the present disclosure.

The light emitted from the light emitting device 14 upon being driven by the optical driver module 114 in the transmitting device 11 may be received by the receiving device 12 directly, and the light emitted from the light emitting device 14 upon being driven by the optical driver module 114 and reflected by other objects, such as a picture, may also be received by the receiving device 12 indirectly for further processing. In an embodiment, the receiving device 12 may be a mobile device, such as a smartphone or a tablet. The image capturing module 121 in the receiving device 12 may be a camera with a rolling shutter (for example, a CMOS camera). The image capturing module 121 is used for capturing an image stream 4 within a time interval during actuation of the light emitting device 14. The image stream 4 may include a plurality of images 41, 42, 43, 44 and 45 as shown in FIG. 5, each of the images represents one frame, and the images 41 to 45 are discontinuous in time, such as, a period of blank existing between the images 41 to 45. This is due to the exposure characteristic of the CMOS camera.

In an embodiment, when capturing images, the image capturing module 121 determines the images with the use of a region of interest (ROI). For example, when capturing a plurality of frames, light emitted from the light emitting device 14 is found in one of the frames, and image recognition and decoding is performed on the emitted or reflected light.

Figure 4:
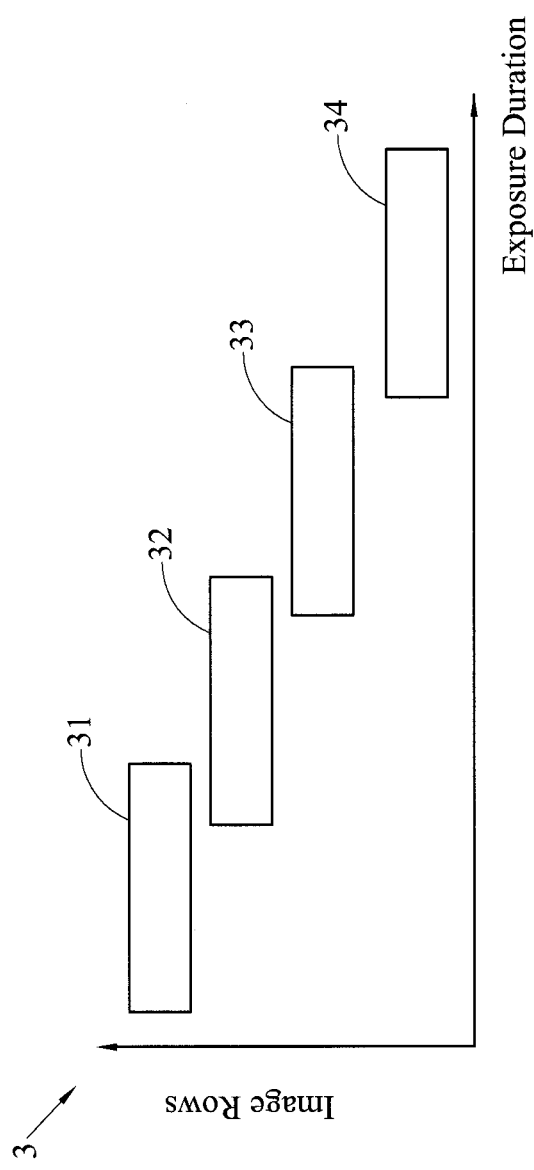
FIG. 4 is a schematic diagram depicting exposure performed by an image capturing module in an optical communication receiving device in accordance with an embodiment of the present disclosure.

Since the image capturing module 121 is a rolling-shutter camera, as shown in FIG. 4, when each frame 3 is under exposure in a unit of time duration (for example, 1/60 of a second), the image capturing module 121 performs exposure row by row, and each frame 3 will have a plurality of exposure areas 31, 32, 33 and 34. When the light emitting device 14 switches quickly between on and off, as shown in FIG. 5, bright stripes 411 and dark stripes 412 are created in the images 41 to 45 captured by the image capturing module 121. Furthermore, depending on the different frequency values used for emitting the light, the widths of the bright stripes 411 and dark stripes 412 in the images 41 to 45 are different. The receiving device 12 may deduce the frequency value corresponding to the light emitted by the light emitting device 14 based on the differences, and determine an identification code corresponding to the particular frequency value in turn. An example of the decoding mechanism is explained in more details below.

It should be noted that the receiving device 12 includes the image capturing module 121, the image decoding module 122, the I/O module 125 and the user display module 126, wherein the image capturing module 121 is a hardware such as a camera with a rolling shutter, and the image decoding module 122 may be instructions to be executed by software in the receiving device 12. The instructions may be executed by a processor in the receiving device 12. The I/O module 125 is an I/O circuit or other communication transceiver element or circuit, such as a USB, BT, Wi-Fi, Ethernet or RS232 interface. The user display module 126 may be a screen of the receiving device 12.

The image decoding module 122 is used for processing the plurality of images 41 to 45 to obtain a plurality of frequency codes. More specifically, the image decoding module 122 further includes the image processing module 123 and the classification module 124. The image processing module 123 is used for processing the plurality images 41 to 45 to obtain a plurality of pattern images, each of the pattern images including at least one pattern in a cycle, and a plurality of width calculations of stripes in the pattern images. The classification module 124 is used for analyzing the widths of stripes in the pattern images to obtain a plurality of width values of the patterns in the pattern images. The width values correspond to the frequency codes.

Figure 6:
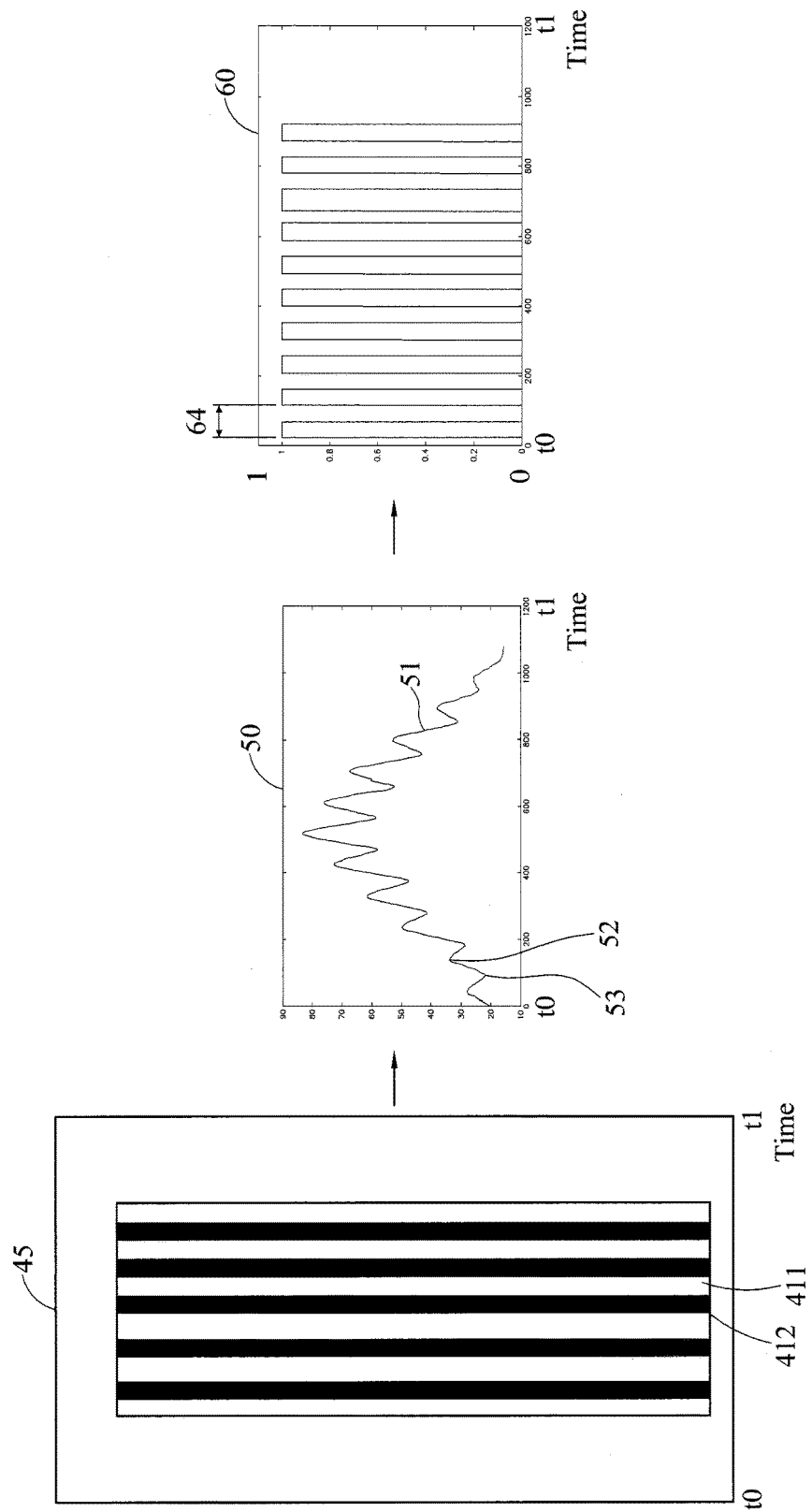
FIG. 6 is a schematic diagram depicting thresholding performed by an image processing module in the optical communication receiving device in accordance with an embodiment of the present disclosure.

More specifically, as shown in FIG. 6, the image processing module 123 is used for processing the plurality of images 41 to 45 to generate a plurality of pattern images. As shown in FIG. 6, taking the image 45 in FIG. 5 as an example, signal compression may be performed on the image 45 firstly, wherein the image is divided into rows and an average value of illuminations of each row is obtained. This step may greatly reduce the amount of computations required. Then, a pattern image 50 is obtained. The pattern image 50 includes a pattern (such as a waveform). The peaks 52 of the pattern 51 represent the locations of the bright stripes 411 in the image 45, whereas the troughs 53 of the pattern 51 represent the locations of the dark stripes 412 in the image 45. Next, thresholding is performed on the pattern image 50 to obtain an image after thresholding 60. The thresholding means binarizing the gradients of the pattern 51 in the pattern image 50, such as, binarizing each signal, respectively, wherein a peak 52 of the waveform in the pattern image 50 corresponds to 1 in the image after thresholding 60, while a trough 51 of the waveform in the pattern image 50 corresponds to 0 in the image after thresholding 60 is performed. Thus, a waveform with only two values is formed. In an embodiment, a frequency width 64 of the image after thresholding 60 corresponds to the width of a pair of bright strip 411 and dark stripe 412 in the image 45.

Figure 7:
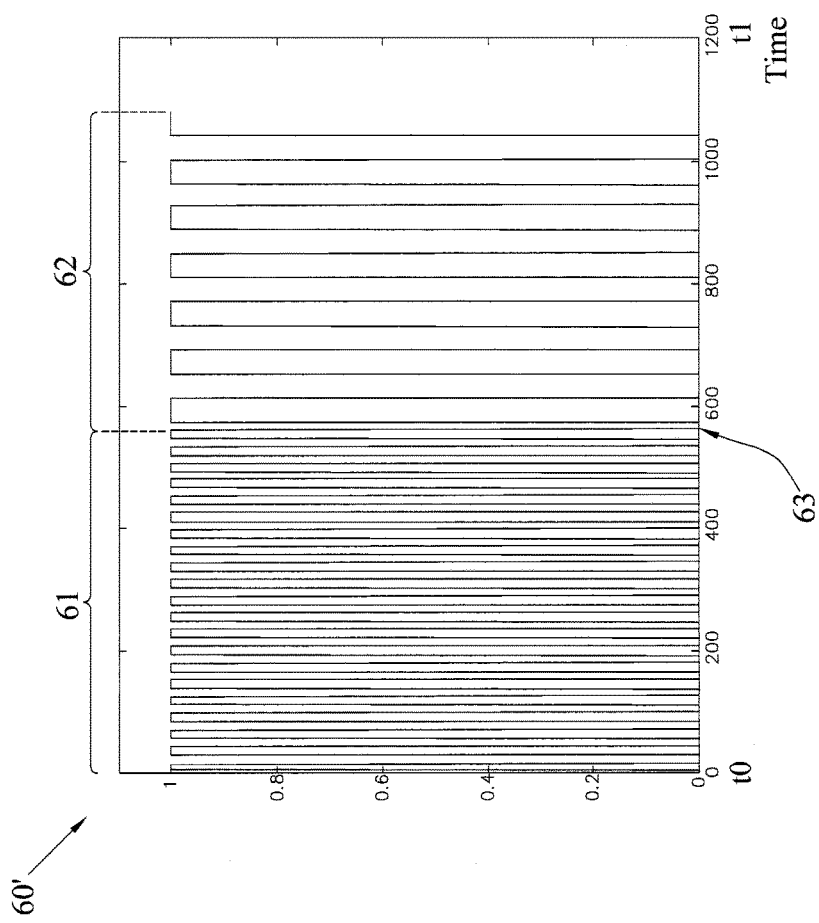
FIG. 7 is a schematic diagram depicting segmentation on an image after thresholding performed by the image processing module in the optical communication receiving device in accordance with an embodiment of the present disclosure.
Figure 8:
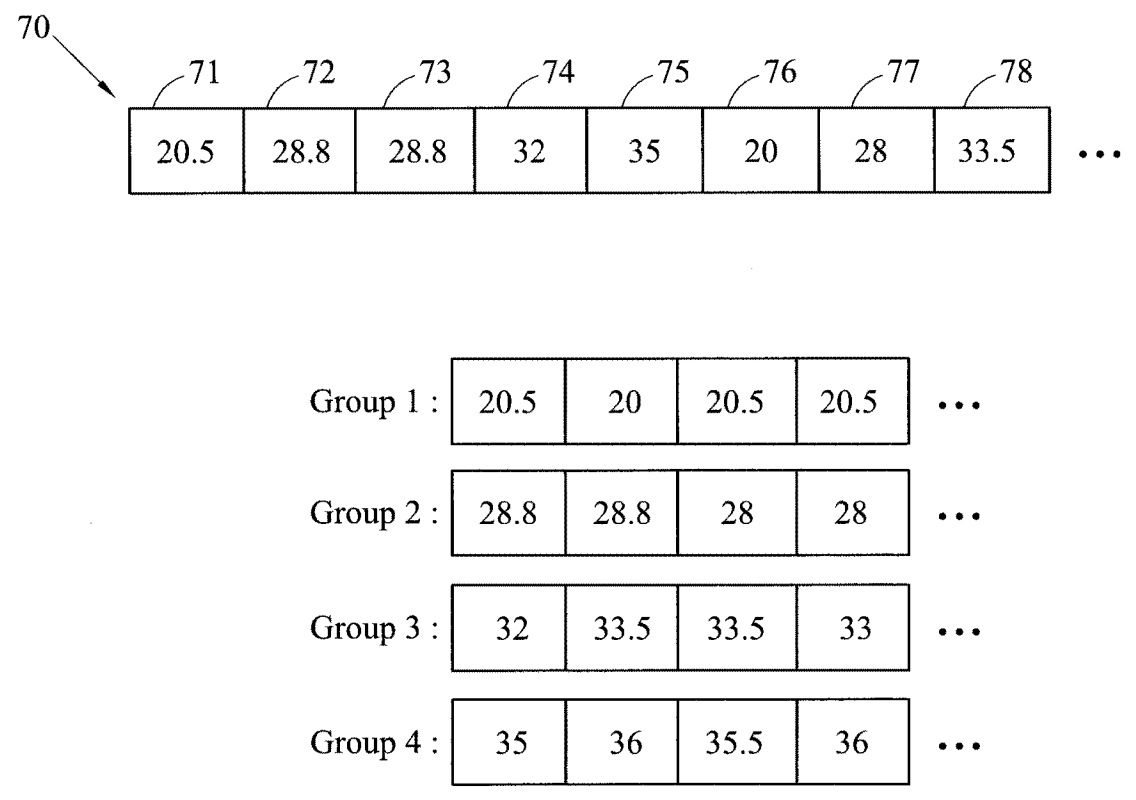

In an embodiment, as shown in FIG. 7, a type of frequency width 62 includes a full waveform after thresholding. The frequency corresponding to the waveform is represented by the stripe width. More specifically, an image after thresholding 60' may include a first type of frequency width 61 and a second type of frequency width 62. This is because the time at which the image capturing module 121 started capturing images may not match with the time at which the light emitting device 14 started to emit a light of a particular frequency. Therefore, when the image after thresholding 60' includes more than one frequency widths (for example, the first type of frequency width 61 and the second type of frequency width 62), the image processing module 123 needs to perform segmentation on different frequency widths in the image after thresholding 60'. For example, as shown in FIG. 7, the first type of frequency width 61 in the image after thresholding 60' is shorter, which may correspond to a higher frequency value, while the second type of frequency width 62 is longer, which may correspond to a lower frequency value. The image processing module 123 may segment the first type of frequency width 61 and the second type of frequency width 62 at a segmentation point 63 (such as, where frequency width has a dramatic change, for example, increases or decreases significantly). After segmentations is performed on the plurality of images after thresholding based on different frequency widths, a sequence 70 including a plurality of width values 71-78 may be obtained as shown in FIG. 8. In this embodiment, width values 71 and 72 respectively correspond to the first type of frequency width 61 and the second type of frequency width 62 in the image after thresholding 60' and so on. The scope of the present disclosure does not limit the number of frequency widths that an image after thresholding 60' may contain. In an embodiment, the image may contain just one frequency width or more than two frequency widths.

In FIG. 8, the sequence 70 is found by performing frequency estimation algorithm on the plurality of image after thresholding and segmentation. That is, each frequency width corresponds to a specific width value based on the frequency estimation algorithm. The classification module 124 performs classification on the plurality of width values 71-78 based on the order of the sequence 70 to obtain the encoding sequence with a plurality of frequency codes that correspond to the plurality of width values 71-78 in the sequence 70 based on the results of the classification, so as to subsequently obtain the communication information based on the encoding sequence of the plurality of frequency codes.

In an embodiment, the classification module 124 performs real-time unsupervised classification on the plurality of width values 71-78. For example, the width value 71 is placed on the leftmost location in group 1; the width value 72 is placed on the leftmost location in group 2; the width value 73 is placed on the second leftmost location in group 2; the width value 74 is placed on the leftmost location in group 3; the width value 75 is placed on the leftmost location in group 4; the width value 76 is placed on the second in group 1; the width value 77 is placed on the third leftmost location in group 2; the width value 78 is placed on the second leftmost location in group 3; and so on.

After sorting the width values into groups 1-4 by the classification module 124, the image decoding module 122 uses group 1 as the reference and finds a plurality of width values based on the results of the classification in order to arrive at the original width sequence, from which the encoding information may be decoded. Taking the above encoding information with 4 digits of frequency codes and each frequency code corresponding to a specific frequency value as an example, a specific frequency code in the encoding information may be set to have a much higher frequency value than those corresponding to the rest of the frequency codes. For example, the $1^{st}$-digit frequency code 21 is set as the preamble, while the $2^{nd}$, $3^{rd}$- and $4^{th}$-digit frequency codes 22-24 may be set as data symbols 1-n. This significantly higher frequency value may correspond to a lower width value (for example, the value of the width value 71 is 20.5) after width value conversion. As such, it may be determined that group 1 corresponds to 0 in frequency codes 0123 of the encoding information; group 2 corresponds to 1; group 3 corresponds to 2; and group 4 corresponds to 3. In other words, the purpose of a higher frequency value is to allow easy identification. However, the scope of the present disclosure is not limited to using the highest frequency value as a characteristic for identification, and the lowest frequency value may also be used as a characteristic for identification, or a characteristic that is distinct from other characteristics may be used for identification.

After the receiving device 12 obtains the plurality of frequency codes of the encoding information, the I/O module 125 then outputs this encoding information to a cloud server 13. The cloud server 13 includes a database 131, a cloud data input module 132, a lookup module 133 and a cloud data output module 134.

The database 131 stores content information corresponding to the encoding information. The cloud data input module 132 is used for receiving the plurality of frequency codes obtained by the receiving device 12. The lookup module 133 is used for looking up content information corresponding to the frequency codes. The cloud data output module 134 is used for returning the content information found by the lookup module 133 back to the I/O module 125 of the receiving device 12. Finally, the receiving device 12 displays the content information on the user display module 126. In an embodiment, the content information may be pictures, videos, websites, production information or the like, which are displayed on the user display module 126. The I/O module 125 of the present disclosure does not limit the way the encoding information is transmitted to the cloud server 13. In an embodiment, the encoding information may be transmitted by BT, Wi-Fi, 3G/4G or the like, for example.

The optical communication system of the present disclosure may be applied in the following scenario. Transmitting devices with different encoding information are combined with different light emitting devices, and a user may use a receiving device to decode the light emitted or reflected by the different light emitting devices to obtain different content information. For example, in an art exhibition, various artworks may be provided with transmitting devices with different encoding information, and a user may then obtain information about a specific artwork by decoding the light emitted or reflected from the artwork using a mobile device.

The present disclosure also provides an optical communication transmitting device and an optical communication receiving device. The key technical contents of the optical communication transmitting device correspond to the transmitting device 11 in the optical communication system 1 described above, whereas the key technical contents of the optical communication receiving device correspond to the receiving device 12 in the optical communication system 1 described above. Same or similar technical contents will not be repeated again.

Figure 2:
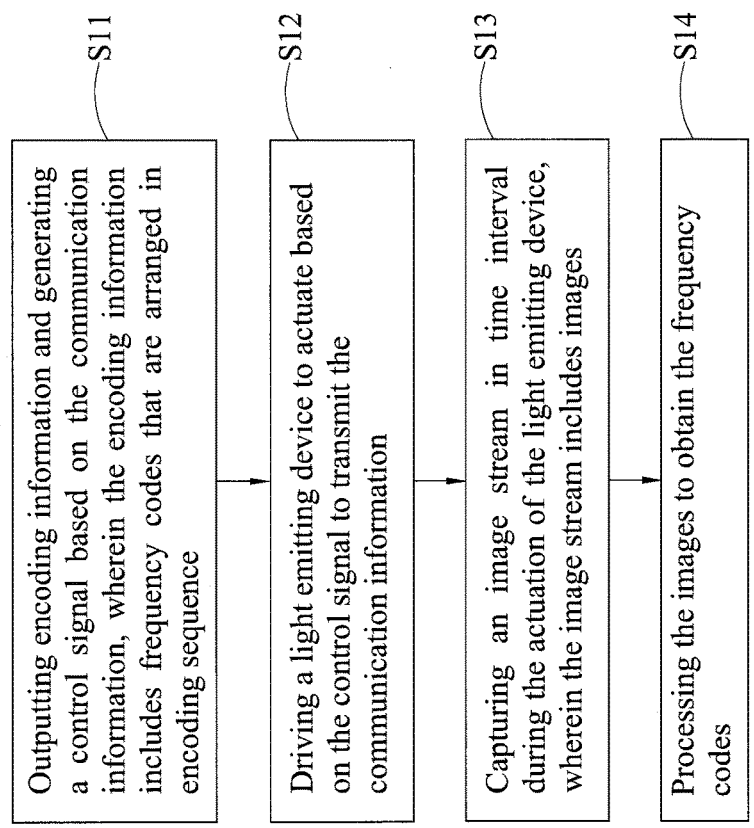
FIG. 2 is a flowchart depicting an optical communication method in accordance with an embodiment of the present disclosure.

Referring to FIG. 2, an optical communication method is further provided, which includes the following steps. In step S11, at least one encoding information is outputted based on a communication information and a control signal is generated, wherein the encoding information includes a plurality of frequency codes that are arranged according to an encoding sequence. In step S12, a light emitting device is driven to actuate based on the control signal to transmit the communication information. In step S13, an image stream is captured in a time interval during the actuation of the light emitting device, wherein the image stream includes a plurality of images. In step S14, the plurality of images are processed to obtain a plurality of frequency codes.

In an embodiment, the control signal is pulse signals with a plurality of frequency values. The plurality of frequency values correspond to the plurality of frequency codes included in the encoding information.

In an embodiment, in step S11, such as, before the control signal is generated, the following steps are included: first an average value of illuminations corresponding to the plurality of frequency codes is calculated, then the duty ratio corresponding to each frequency code is adjusted based on the average value, and the control signal is generated after modulation, wherein the control signal is a frequency-shift keying signal.

In an embodiment, in step 14, the step that the plurality of images are processed to obtain a plurality of frequency codes may further include the following steps. The plurality of images are processed to obtain a plurality of pattern images, wherein any one of the plurality of pattern images includes at least one pattern in a cycle. The image processing module then analyzes the plurality of pattern images to obtain a plurality of width values corresponding to the patterns in the pattern images. The width values correspond to the frequency codes. The plurality of width values are sequentially classified based on the order of the sequence of the plurality of width values to obtain the encoding sequence with the plurality of frequency codes corresponding the plurality of width values arranged in the sequence order based on the results of the classification, so as to obtain the communication information based on the encoding sequence of the plurality of frequency codes.

In an embodiment, before a plurality of pattern images are obtained, signal compression is performed on the images to obtain the plurality of pattern images. Thereafter, thresholding is performed on the plurality of pattern images to obtain a plurality of width values corresponding to the patterns in the plurality of pattern images.

In an embodiment, after step S14, after obtaining the plurality of frequency codes, the following step is included. Content information corresponding to the plurality of frequency codes is returned based on the plurality of frequency codes.

The detailed technical contents of the optical communication method of the present disclosure above are substantially the same or similar to those of the optical communication system, and will not be repeated.

With the optical communication system, optical communication method, transmitting device and receiving device of the present disclosure, since the present disclosure allows the optical communication transmitting device to transmit an encoded light flashing signal via optical camera communications (OCC) technology, such that after the optical communication receiving device receives the light, it is able to decode the light and display content associated with this signal. The present disclosure is capable of decoding as long as the receiving device is within the optical range, thereby eliminating the issue that signals cannot be read effectively using the prior art technology, such as QR code, NFC or Beacons. In addition, the optical communication transmitting device of the present disclosure allows communication using the light emitting device, whereas the optical communication receiving device only needs to have a built-in camera and a decoding software for optical communication to be carried out. This allows manufacturers to quickly get into the market. Moreover, the present disclosure uses frequency-shift keying technology, which reduces data loss across images (frames) when receiving signals. Further, real-time unsupervised classification reduces the use of non-data symbols, which further increases the transmission rate.

The above embodiments are only used to illustrate the principles of the present disclosure, and should not be construed as limit the present disclosure in any way. The above embodiments may be modified by those with ordinary skill in the art without departing from the scope of the present disclosure as defined in the following appended claims.

What is claimed is:

1. An optical communication system, comprising:
    a light emitting device configured for illuminating and transmitting communication information;
    a transmitting device, including:
        an encoding module configured for outputting at least one encoding information based on the communication information, wherein the encoding information includes a plurality of frequency codes arranged in an encoding sequence;
        an optical signal generating module configured for generating a control signal based on the encoding information; and
        an optical driver module configured for driving the light emitting device to actuate based on the control signal and transmit the communication information; and
    a receiving device, including:
        an image capturing module configured for capturing an image stream in a time interval during the actuation of the light emitting device, wherein the image stream includes a plurality of images; and
        an image decoding module configured for processing the plurality of images to obtain the plurality of frequency codes.

2. The optical communication system of claim 1, wherein the image decoding module further includes:
    an image processing module configured for processing the plurality of images to obtain a plurality of pattern images, wherein any one of the plurality of pattern images includes at least one pattern arranged in a cycle, and the image processing module is further configured for analyzing the plurality of pattern images to obtain a plurality of width values of the patterns in the plurality of pattern images, each of the plurality of width values corresponding to the frequency code; and
    a classification module configured for classifying the plurality of width values according to a sequence order of the plurality of width values to obtain the encoding sequence of the plurality of frequency codes corresponding to the plurality of width values arranged according to the sequence order based on a result of the classification, and to obtain the communication information based on the encoding sequence of the plurality of frequency codes.

3. The optical communication system of claim 2, wherein the image processing module performs signal compression on the plurality of images to obtain the plurality of pattern images.

4. The optical communication system of claim 3, wherein the image processing module performs thresholding on the plurality of pattern images to obtain the plurality of width values corresponding to the patterns in the plurality of pattern images.

5. The optical communication system of claim 2, wherein the classification module performs real-time unsupervised classification on the plurality of width values.

6. The optical communication system of claim 1, wherein the control signal generated by the optical signal generating module includes pulse signals with a plurality of frequency values, the plurality of frequency values corresponding to the plurality of frequency codes included in the encoding information.

7. The optical communication system of claim 6, wherein in the control signal generated by the optical signal generating module, units of time corresponding to the plurality of frequency values are fixed.

8. The optical communication system of claim 1, wherein after receiving the encoding information outputted by the encoding module, the optical signal generating module first calculates an average value of illuminations corresponding to the plurality of frequency codes, then adjusts a duty ratio for each of the plurality of frequency codes based on the average value, and then performs modulation to generate the control signal, and wherein the control signal is a frequency-shift keying signal.

9. The optical communication system of claim 1, wherein the receiving device further includes:
an input/output (I/O) module configured for transmitting the encoding information to a cloud server or receiving content information corresponding to the encoding information returned by the cloud server; and
a user display module configured for displaying the content information.

10. The optical communication system of claim 1, further comprising a cloud server including:
a database configured for storing content information corresponding to the encoding information;
a cloud data input module configured for receiving the encoding information obtained by the receiving device;
a lookup module configured for looking up the content information corresponding to the encoding information; and
a cloud data output module configured for returning the content information obtained by the lookup module to the receiving device.

11. The optical communication system of claim 1, wherein the transmitting device further includes an I/O module, and the encoding module outputs the encoding information based on pre-stored default communication information or communication information input via the I/O module.

12. The optical communication system of claim 1, wherein the image capturing module is a camera with a rolling shutter.

13. The optical communication system of claim 12, wherein the plurality of images are images with bright stripes and dark stripes.

14. An optical communication transmitting device, comprising:
a light emitting device configured for illuminating and transmitting communication information;
an encoding module configured for outputting at least one encoding information based on the communication information, wherein the encoding information includes a plurality of frequency codes arranged in an encoding sequence;
an optical signal generating module configured for generating a control signal based on the encoding information; and
an optical driver module configured for driving the light emitting device to actuate based on the control signal and transmit the communication information.

15. The optical communication transmitting device of claim 14, wherein the control signal generated by the optical signal generating module includes pulse signals with a plurality of frequency values, the plurality of frequency values corresponding to the plurality of frequency codes included in the encoding information.

16. The optical communication transmitting device of claim 15, wherein in the control signal generated by the optical signal generating module, units of time corresponding to the plurality of frequency values are fixed.

17. The optical communication transmitting device of claim 14, wherein after receiving the encoding information outputted by the encoding module, the optical signal generating module first calculates an average value of illuminations corresponding to the plurality of frequency codes, then adjusts a duty ratio for each of the plurality of frequency codes based on the average value, and then performs modulation to generate the control signal, and wherein the control signal is a frequency-shift keying signal.

18. The optical communication transmitting device of claim 14, further comprising an I/O module, wherein the encoding module outputs the encoding information based on pre-stored default communication information or communication information input via the I/O module.

19. An optical communication receiving device, comprising:
an image capturing module configured for capturing an image stream in a time interval during actuation of a light emitting device, wherein the image stream includes a plurality of images having bright stripes and dark stripes; and
an image decoding module configured for processing the plurality of images to obtain an encoding information containing a plurality of frequency codes.

20. The optical communication receiving device of claim 19, wherein the image decoding module further includes:
an image processing module configured for processing the plurality of images to obtain a plurality of pattern images, wherein any one of the plurality of pattern images includes at least one pattern arranged in a cycle, and the image processing module is further configured for analyzing the plurality of pattern images to obtain a plurality of width values of the patterns in the plurality of pattern images, each of the plurality of width values corresponding to a frequency code; and
a classification module configured for classifying the plurality of width values according to a sequence order of the plurality of width values to obtain an encoding sequence of the plurality of frequency codes corresponding to the plurality of width values arranged according to the sequence order based on a result of the classification, and to obtain communication information based on the encoding sequence of the plurality of frequency codes.

21. The optical communication receiving device of claim 20, wherein the image processing module performs signal compression on the plurality of images to obtain the plurality of pattern images.

22. The optical communication receiving device of claim 21, wherein the image processing module performs thresholding on the plurality of pattern images to obtain the plurality of width values corresponding to the patterns in the plurality of pattern images.

23. The optical communication receiving device of claim 20, wherein the classification module performs real-time unsupervised classification on the plurality of width values.

24. The optical communication receiving device of claim 19, further comprising:
- an I/O module configured for transmitting the encoding information to a cloud server or receiving content information corresponding to the encoding information returned by the cloud server; and
- a user display module configured for displaying the content information.

25. The optical communication receiving device of claim 19, further comprising a cloud server including:
- a database configured for storing content information corresponding to the encoding information;
- a cloud data input module configured for receiving the encoding information obtained by the optical communication receiving device;
- a lookup module configured for looking up the content information corresponding to the encoding information; and
- a cloud data output module configured for returning the content information obtained by the lookup module to the optical communication receiving device.

26. The optical communication receiving device of claim 19, wherein the image capturing module is a camera with a rolling shutter.

27. An optical communication method, comprising:
- outputting at least one encoding information and generating a control signal based on communication information, wherein the encoding information includes a plurality of frequency codes arranged in an encoding sequence;
- driving a light emitting device to actuate based on the control signal and transmit the communication information;
- capturing an image stream in a time interval during the actuation of the light emitting device, wherein the image stream includes a plurality of images having bright stripes and dark stripes; and
- processing the plurality of images to obtain the plurality of frequency codes.

28. The optical communication method of claim 27, wherein processing the plurality of images to obtain the plurality of frequency codes includes:
- processing the plurality of images to obtain a plurality of pattern images, wherein any one of the plurality of pattern images includes at least one pattern arranged in a cycle;
- analyzing the plurality of pattern images to obtain a plurality of width values of the patterns in the plurality of pattern images, wherein each of the width values corresponds to a frequency code; and
- classifying the plurality of width values according to a sequence order of the plurality of width values to obtain the encoding sequence of the plurality of frequency codes corresponding to the plurality of width values arranged according to the sequence order based on a result of the classification, and to obtain the communication information based on the encoding sequence of the plurality of frequency codes.

29. The optical communication method of claim 28, further comprising performing signal compression on the plurality of images to obtain the plurality of pattern images.

30. The optical communication method of claim 29, further comprising performing thresholding on the plurality of pattern images to obtain the plurality of width values corresponding to the patterns in the plurality of pattern images.

31. The optical communication method of claim 28, wherein classifying the plurality of width values includes real-time unsupervised classification on the plurality of width values.

32. The optical communication method of claim 27, wherein the control signal includes pulse signals with a plurality of frequency values, the plurality of frequency values corresponding to the plurality of frequency codes included in the encoding information.

33. The optical communication method of claim 32, wherein in the control signal, units of time corresponding to the plurality of frequency values are fixed.

34. The optical communication method of claim 27, further comprising, before generating the control signal, calculating an average value of illuminations corresponding to the plurality of frequency codes, then adjusting a duty ratio for each of the plurality of frequency codes based on the average value, and then performing modulation to generate the control signal, wherein the control signal is a frequency-shift keying signal.

35. The optical communication method of claim 27, further comprising, after obtaining the plurality of frequency codes, returning content information corresponding to the plurality of frequency codes based on the plurality of frequency codes.

* * * * *